REVERSIBLE IRRIGATION LINES

Original Filed July 20, 1967 4 Sheets-Sheet 1

GREGORY J. WIECK
INVENTOR

BY
BUCKHORN, BLORE, KLARQUIST & SPARKMAN
ATTORNEYS

REVERSIBLE IRRIGATION LINES
Original Filed July 20, 1967 4 Sheets-Sheet 2
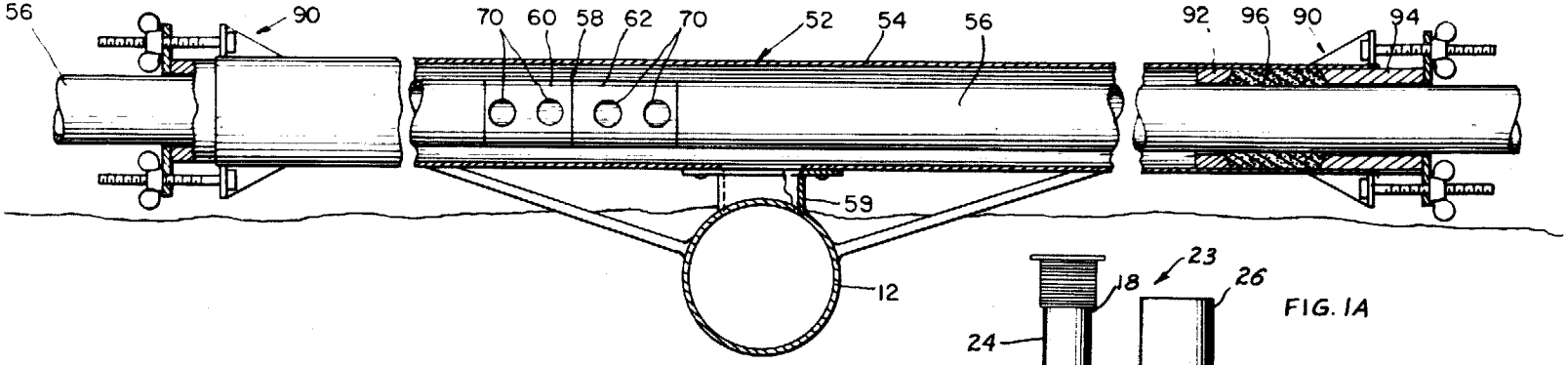
FIG. 2
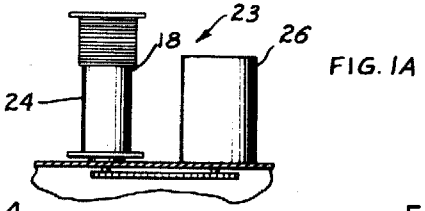
FIG. 14
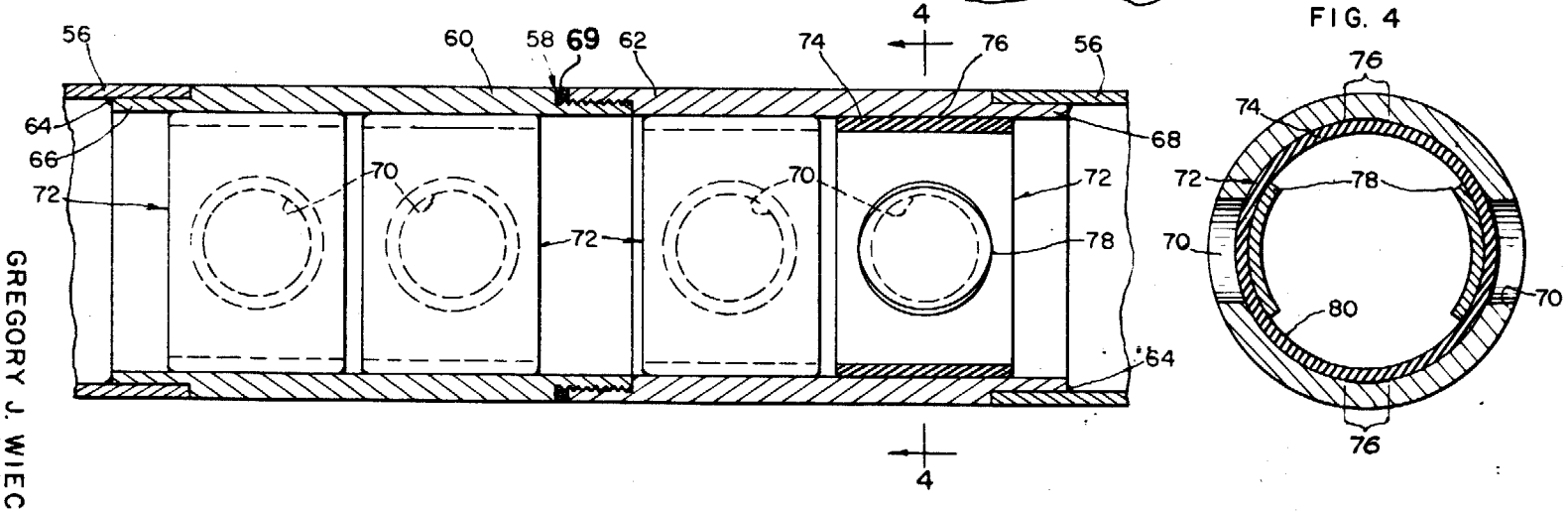
FIG. 4
FIG. 3
GREGORY J. WIECK
INVENTOR
BY
BUCKHORN, BLORE, KLARQUIST & SPARKMAN
ATTORNEYS

REVERSIBLE IRRIGATION LINES

Original Filed July 20, 1967 4 Sheets-Sheet 3

GREGORY J. WIECK
INVENTOR

BY
BUCKHORN, BLORE, KLARQUIST & SPARKMAN
ATTORNEYS

REVERSIBLE IRRIGATION LINES

Original Filed July 20, 1967 4 Sheets-Shoet 4

GREGORY J. WIECK
INVENTOR

BY
BUCKHORN, BLORE, KLARQUIST & SPARKMAN
ATTORNEYS

United States Patent Office

Re. 27,059
Reissued Feb. 16, 1971

27,059
REVERSIBLE IRRIGATION LINES

Gregory J. Wieck, Enterprise, Oreg. 97828

Original No. 3,447,751, dated June 3, 1969, Ser. No. 654,809, July 20, 1967. Application for reissue Sept. 12, 1969, Ser. No. 866,411
Int. Cl. A01g *25/02*
U.S. Cl. 239—212 23 Claims

Matter enclosed in heavy brackets [ ] appears in the original patent but forms no part of this reissue specification; matter printed in italics indicates the additions made by reissue.

ABSTRACT OF THE DISCLOSURE

A long hose having sprinklers at both ends forms, with a cable running over a reversible, powered capstan, an endless, reversible towline. The length of the hose is about one-half of the length of the area to be irrigated and the hose is advanced through an injection tube at the central portion of the area to be irrigated, and water under pressure supplied to the tube enters the hose through check valves in thick-walled coupling portions spaced along the hose. The check valves are in the form of elastic sleeves fitting in the coupling portions, each sleeve normally covering two oppositely disposed openings in the coupling portion and adapted to buckle from the higher water pressure in the injection tube to admit water into the hose. Each sleeve preferably has stiff backing plates on its inside and plugs on its outside filling the openings in the coupling portion. The openings preferably are elliptical. Washing chambers at the ends of the injection tubes wash the hose before it enters the seals in the injection tubes. In one construction, two hoses with sprinklers are disposed in parallel relationship in one side of a field with two cables connecting their ends and forming an endless towline therewith, one cable being on a capstan of a drive unit midway between two sides of the field. Two other parallel hoses and cables are positioned in the other half of the field and are pulled by a second capstan of the drive unit. In another construction, a power unit midway between two sides of the field pulls two parallel cables to pull two hoses through injection tubes from one side of the field to the center of the field. The injection tubes then are disconnected from a fixed pipeline in the first half of the field, the cables are disconnected from the hoses, the hoses and injection tubes are towed by a tractor to the second half of the field, the injection tubes are connected to a pipeline in the second half of the field, the cables are connected to the other ends of the hoses, and the power unit pulls the hoses to the power unit from the far side of the second half of the field.

The invention relates to reversible irrigation lines, and more particularly to movers in which water supplying hoses form portions of towlines.

An object of the invention is to provide an improved reversible irrigation line.

Another object of the invention is to provide movers in which water supplying hoses form portions of towlines.

Another object of the invention is to provide an irrigation line in which a hose carrying sprinklers at its opposite ends is movable through an injection tube supplying water to the hose through check valves in the hose at points spaced therealong.

Another object of the invention is to provide a pressure operated valve structure for an irrigation line.

A further object of the invention is to provide an irrigation line including lengths of metal conduit or plastic hose secured together by thick-walled tubular couplings having water admitting openings closed by internal check valves except when the couplings are in an injection tube having water supplied thereto under pressure.

Another object of the invention is to provide a resilient sleeve in a tube normally covering a plurality of openings in the tube to form a plurality of check valves.

Another object of the invention is to provide an irrigation system in which a single power unit drives a capstan to pull two sprinklers forming an endless towline with two connecting cables.

A further object of the invention is to provide an irrigation system in which a pair of sprinkling hoses are pulled by a central power unit through cables across one-half of the field, the hoses then are towed by a tractor to the second half of the field, and the cables are connected to the other ends thereof and the power unit pulls the hoses back across the second half of the field to sprinkle it.

Another object of the invention is to provide an irrigation line pulled through an injection tube having washing chambers and seals at its ends.

The invention provides irrigation lines each including a hose carrying sprinkler means at its ends and forming a part of a towline with a tow cable driven by a drive. The hose preferably has openings spaced therealong and normally closed by check valves, and is supplied with water through the openings as the hose is advanced through a short injection tube supplied with water under pressure. Preferably the hose includes a plurality of hose lengths secured together by thick-walled couplings having openings in the side walls which are normally closed by flexible sleeves mounted in the couplings. Stiffening discs may be secured to the sleeves in alignment with the openings. In one specific embodiment, a drive unit positioned midway between two sides of a field pulls two endless towlines positioned in opposite halves of the field with each towline including a pair of sprinkling hoses and a pair of injection tubes which are positioned in the center of the half of the field in which the two towlines are located. The injection tubes may be supplied by hoses and be movable for short lengths to increase the permissible movements of the hoses. In another specific embodiment, a drive unit positioned midway between two sides of a field first pulls by cables through injection tubes a plurality of sprinkler hoses from one side of the field to the center of the field to sprinkle a first half of the field, the hoses and injection tubes are towed by a tractor to the other side of the field, the cables are connected to the other ends of the hoses, and the hoses are pulled by the drive unit to the center of the field to sprinkle the second half of the field.

A complete understanding of the invention may be obtained from the following detailed description of irrigation lines forming specific embodiments thereof, when read in conjunction with the appended drawings, in which:

FIG. 1A is a fragmentary, vertical sectional view of a portion of the irrigation lines shown in FIG. 1;

FIG. 2 is an enlarged, fragmentary vertical section taken along line 2—2 of FIG. 1;

FIG. 3 is an enlarged horizontal section taken along line 3—3 of FIG. 1;

FIG. 4 is an enlarged vertical section taken along line 4—4 of FIG. 3;

Figure 1:
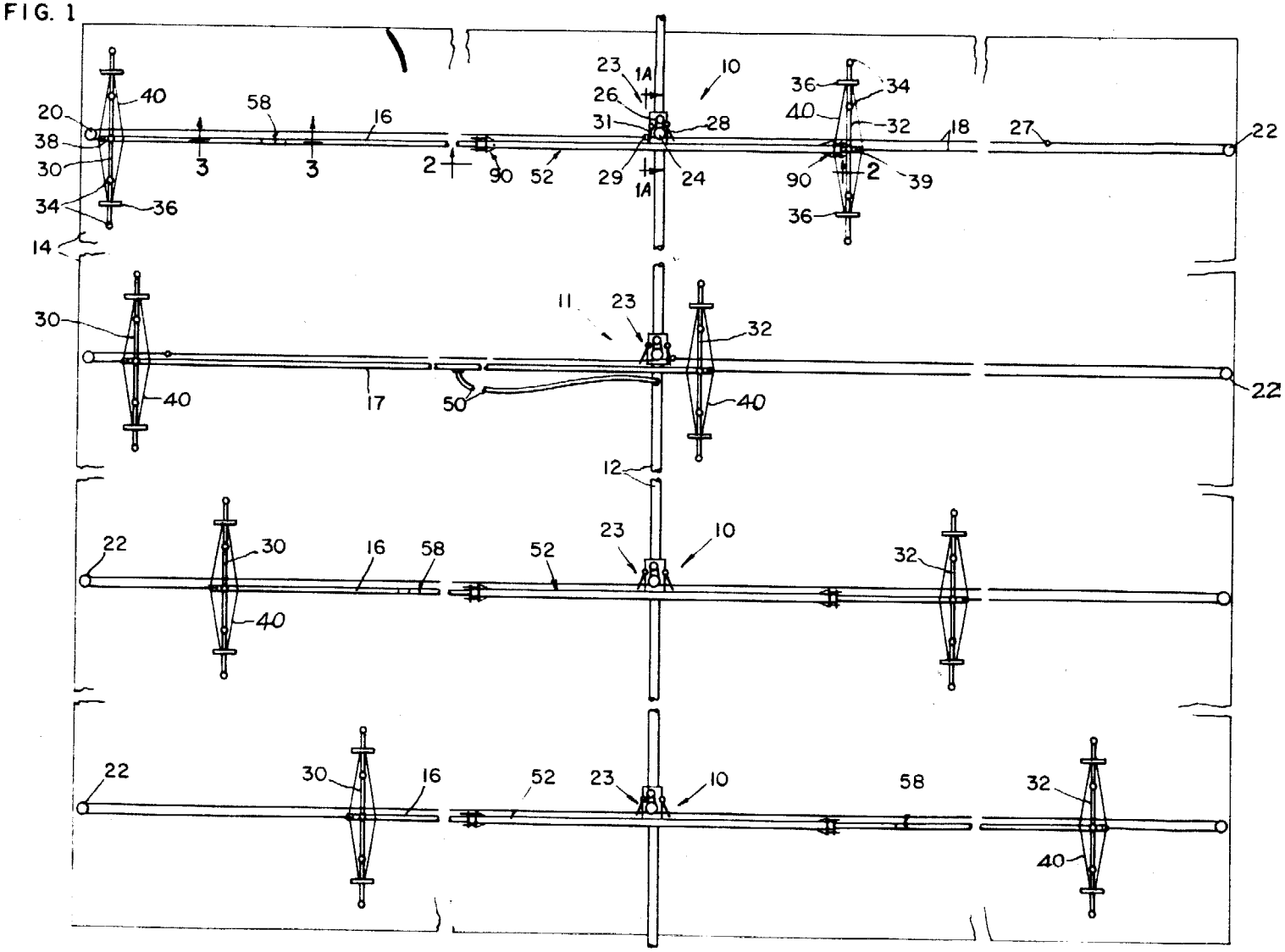
FIG. 1 is a top plan view of a field to be irrigated and improved reversible irrigation lines forming specific embodiments of the invention.

Referring now in detail to the drawings, there is shown in FIGS. 1 to 4 a plurality of reversible irrigation lines or movers 10 and 11 forming specific embodiments thereof. The lines 10 and 11 are mounted for independent operation at spaced points along a pipeline 12 extending along the center of a field 14 to be irrigated. Each line 10 and 11 includes an elongated flexible hose or conduit 16 or 17 of a length slightly greater than one-half the width of the field 14. The hose may be of plastic or may be of metal such as, for example, aluminum or stainless steel. At each hose 16, the ends of a tow cable 18 are attached to opposite ends of the hose, which are plugged, to form an endless towline. The tow cable extends around pulleys 20 and 22 mounted at opposite sides of the field and also extends around a capstan 24 of a drive unit 23 mounted in a fixed position on the pipeline 12 which is buried. The capstan is driven by a reversible motor drive 26, which may be electric or hydraulic. When the motor drive 26 is set to drive in one direction, the cable pulls the hose from left to right, as viewed in FIG. 1, and when the hose reaches the right side of the field a suitable actuator 27 carried by the hose or cable actuates a limit switch 28 to reverse the drive and the drive pulls the hose back to the left until the left-hand end of the hose reaches the left side of the field, when an actuator 29 on the hose or cable actuates a limit switch 31 to again reverse the motor drive. The movements in both these directions may be at the same speed or one may be made much faster to retract the hose to one side with the primary sprinkling being in one direction only.

Short, elevated sprinkler lines 30 and 32 having sprinklers 34 are attached to the ends of the hose 16, and are supplied with water from the hose and are moved *sidewise by the hose as the hose is moved* lengthwise. The lines 30 and 32 are supported in elevated positions by skids or wheels 36. The ends of the hose, as described above, are closed, preferably by plugs 38 which also make the end portions strong to facilitate *connections to clamps 39* connected to the ends of the cable 18. The sprinklers include mast-supported cable bracings 40.

Water continuously under pressure is supplied by the pipeline 12 to the hose 17 by a flexible supply hose 50 of the line 11 of slightly over half the length of the hose 17. However, it is preferable to use the structure associated with each of the hoses of the lines 10, which comprises a slip coupling or jet injector 52 mounted fixedly on the pipeline 12. The coupling 52 includes a short pipe or injection tube 54 of a length sufficient to span a length or section 56 of the flexible hose 16 and at least one thick-walled coupling 58 connecting the lengths 56 of the hose together both mechanically and for fluid flow therethrough. Each coupling 58 includes thick-walled, rigid, threadedly coupled members 60 and 62 secured to and sealed to the end portions of the lengths 56 either by an epoxy adhesive 64 or by threads, reduced portions 66 and 68 of the members 60 and 62 fitting closely in the lengths 56. The halves of the coupling 58 screw together and are sealed by an O-ring 69.

Each of the members 60 and 62 includes pairs of holes 70 therethrough and spaced therealong with the holes of each pair being aligned with each other. The holes 70 are normally closed by check valves 72, which permit water under pressure in the pipe 54 to flow into the line 16 but prevent flow from the line 16 outwardly through the holes 70. Each check valve serves to close one aligned pair of the holes 70 and includes a short, flexible sleeve or tube 74 of rubber extending substantially beyond each side of each hole 70 and secured by narrow, longitudinal strips 76 of adhesive to the member 60 or 62 midway between the holes. Stiffening circular discs 78 cemented or otherwise fastened to inner face 80 of the tube lie in portions of a cylinder and are larger in diameter than the opening 70 and aid in pressing the tube against the portions of the inner wall of the member 60 or 62 to seal the opening 70. When each pair of the openings 70 is in the injection tube 54, the water under pressure supplied to the tube 54 from the pipeline 12 presses against the portions of the tube 74 adjacent the openings and moves those portions of the tube away from the inner wall of the member 60 or 62 to provide passages from the openings 70 into the member 60 or 62 and the water flows into the member 60 or 62. When the pair of openings 70 is out of the injection tube 54, the resiliency of the tube 74 and the pressure of the water in the line 16 presses the tube 74 against the member 60 or 62 to seal off the openings 70. If desired, there may be provided plugs (not shown) fitting loosely in the openings and secured to the tube 74 and lying flush with the exterior of the hose. Each length 56 of the hose is preferably the standard length of forty feet, the length of each coupling 58 is sixteen inches in length, and the length of the injection tube is about forty-two feet, so that there will always be at least the equivalent of one full coupling in the injection tube to always connect the line 16 to its supply of water under pressure. Seals 90 are provided at both ends of each injection tube. Each seal includes a fixed stop ring 92, an adjustable ring 94 and a graphite packing 96 compressed between the rings. The length of the packing preferably is greater than the diameter of each hole 70.

EMBODIMENT OF FIGS. 5–8

Figure 5:
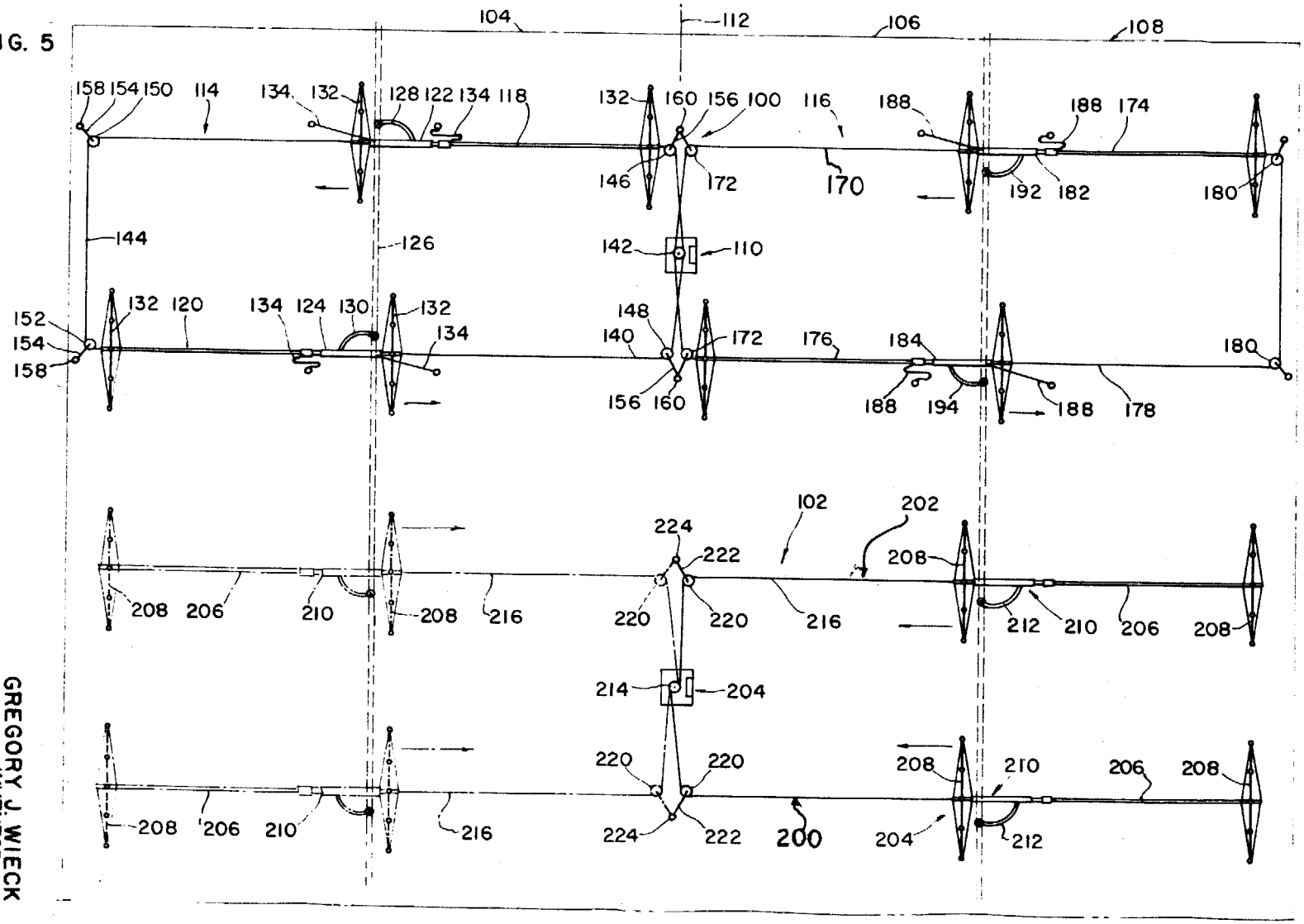
FIG. 5 is a top plan view of a field to be irrigated and irrigation lines forming specific embodiments of the invention.

In FIG. 5 there are shown irrigation systems 100 and 102 each forming a specific embodiment of the invention and operable to sprinkle both halves 104 and 106 of a field 108. In the system 100, a single drive unit 110 at centerline 112 of the field serves to reversibly drive two endless towlines 114 and 116. The tow lines are positioned in the opposite sides of the field, and the towline 114 includes two parallel hoses or conduits 118 and 120 like the hoses 16 and traveling through and supplied with water by injection tubes 122 and 124, respectively. The injection tubes are supplied with water under pressure by a buried pipeline 126 extending along the center of the half 104 of the field and flexible connector conduits or hoses 128 and 130, which permit reciprocation of the injection tubes through a distance of about the length of each injection tube. The hoses 118 and 120 are connected at their ends and supply water to elevated wheeled or skid-supported sprinkler lines 132. Cables 134 anchored at one end limit travel of the injection tubes.

The ends of hoses 118 and 120 nearest to the drive unit 110 are connected by a cable 140 entrained about one of the superimposed capstans 142 of the drive unit 110, and a cable 144 connects together the other ends of the hoses 118 and 120. The cable 140 travels around guide sheaves 146 and 148, and the cable 144 travels around sheaves 150 and 152. The sheaves 146, 148, 150 and 152 are held by cables 154 and 156 identical to the towline 140 and secured to anchors 158 and 160.

The towline 116 is identical to the towline 114 but is reversed or handed relative thereto. The towline 116 includes a cable 170 wrapped around and pulled by one of the capstans 142 and guided by sheaves 172 held by the anchors 160. The cable 170 is connected to inner ends of hoses or conduits 174 and 176 and a cable 178 connects the outer ends of the hoses 174 and 176 and travels around anchored sheaves 180. The hoses 174 and 176 travel through injection tubes 182 and 184, respectively, which are movable longitudinally for short distances as limited by anchored cables 188. Flexible connector conduits or hoses 192 and 194 connect to the injection tubes 182 and 184 a buried pipeline 126 of water under pressure and positioned midway of the half 106 of the field 108. The drive unit 110 serves to simultaneously drive the towlines 114 and 116 to sprinkle the adjacent portions of both halves of the field.

The irrigation system 102 includes identical towlines 200 and 202 which are not endless and are pulled in the same direction by a reversible power unit 204. The towlines 200 and 202 include flexible hoses or conduits 206 like the hoses 118 and carrying and supplying water to sprinklers 208 at their ends. The hoses travel through and receive water from injection tubes 210 supplied with water from the pipeline 126 through short flexible connecting conduits 212. Reels 214 of the drive unit 204 take up cables 216 to pull the hoses 206 to the left to sprinkle the adjacent portions of the half 106 of the field until the forward sprinklers 208 arrive at sheaves 220 carried by anchor cables 222 secured to anchors 224, it taking several days to water the half 106. Then the conduits 212 are disconnected from the pipeline 126, the cables 216 are disconnected from the hoses 206, and a tractor is used to pull the hoses 206 and injection tubes 210 to the far side of the half 104 of the field to the broken line positions of these structures. The conduits 212 then are connected to the pipeline 126, the cables 216 are connected to the right-hand ends of the hoses 206, and the drive unit 204 is actuated to take up the cables 216 to pull the hoses from left to right to sprinkle the half 104 of the field.

Figure 6:
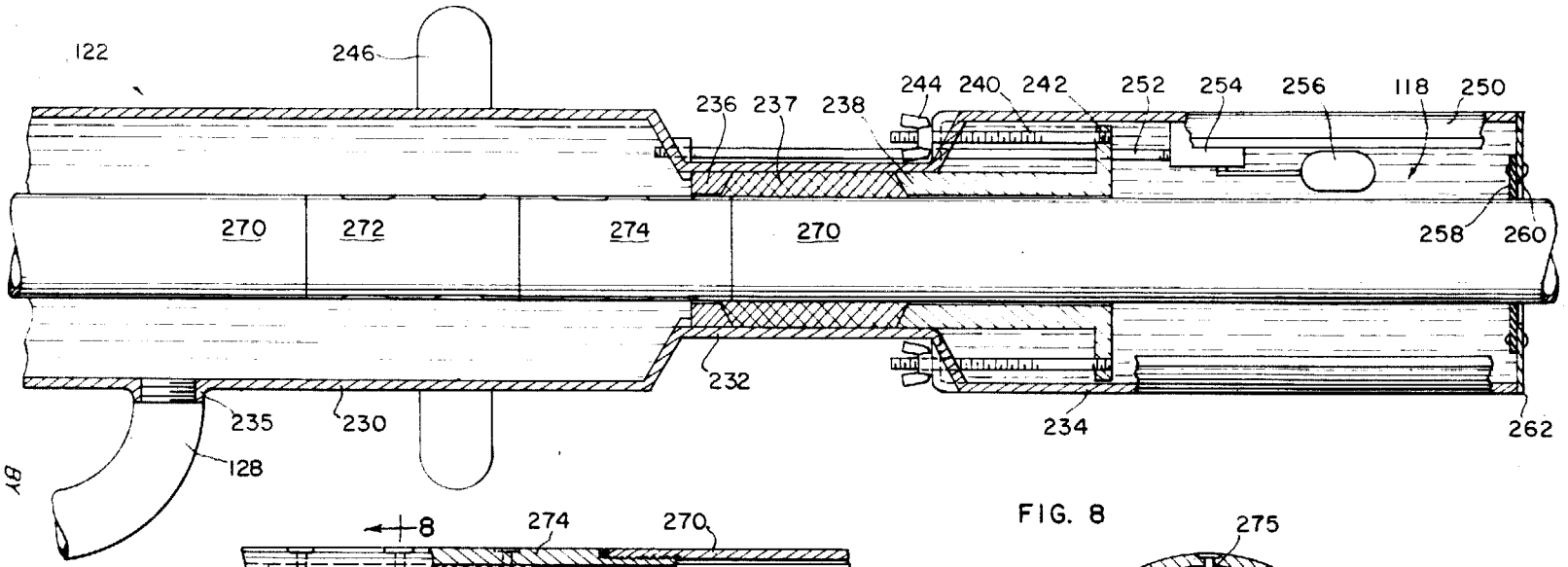
FIG. 6 is an enlarged horizontal section of one of the lines of FIG. 5.

The injection tube 122 (FIGS. 5 and 6) includes an elongated central portion 230 of about twice the diameter of the hose 118, and also includes at both ends reduced or necked down portions 232 and larger washing containers 234. The conduit 128 is connected to a nipple 235 leading into the interior of the injection tube. A graphite packing 237 is pressed between a fixed annular stop 236 and an annular stop 238 pushed toward the left as viewed in FIG. 6, by threaded pull rods 240 engaging ears 242 of the stop 238 with wing nuts 244 threaded on the pull rods and accessible from the exterior of the tube, the nuts 244 being within the projected area of the central portion 230 so as to facilitate sliding the injection tube through loose soil. The tube 122 is prevented from rotating by low skids 246.

Each washing container 234 is generally cylindrical and of the same size as and aligned with the central portion 230 of the injection tube 122. The washing container has a top cutout or opening 250 to provide access to the interior of the container for cleaning out dirt and debris. Water is supplied to the washing container through a small conduit 252 leading from the reduced portion 232 to a valve 254 controlled by a float mechanism 256. The float mechanism closes off the valve 254 whenever the water approaches the opening 250 and maintains the water at a level above the top of the hose 118. A flexible, elastic seal 258 closes a hole 260 in an end wall 262 through which the hose 118 freely passes.The passing of the hose 118 through the washing container serves to wash mud and debris from the hose prior to entrance of the hose into the graphite seal 237 and the reduced portion of the injection tube. The seal 258 also brushes or scrapes most loose debris from the hose prior to its entrance into the washing container.

Figure 8:
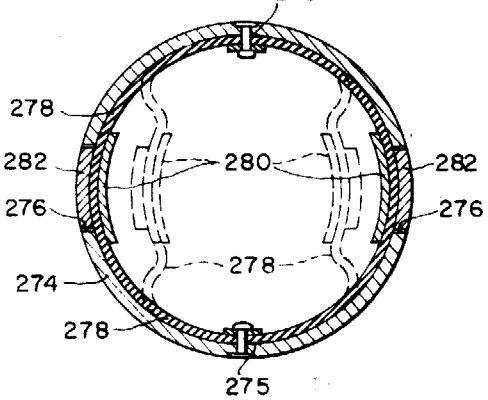
FIG. 8 is an enlarged vertical section taken along line 8—8 of FIG. 7.
Figure 7:
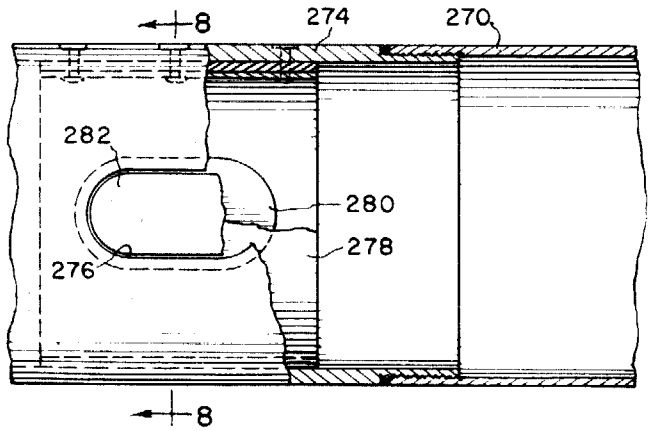
FIG. 7 is an enlarged, partially sectional view of the irrigation line of FIG. 5.

The hose 118 (FIGS. 5, 7 and 8) includes aluminum stainless steel or plastic pipe sections 270 of standard pipe length such as, for example, forty feet. The sections are connected by shorter tubular connectors or couplings 272 and 274 threaded and sealed together and to the adjacent ends of the sections 270. The connectors 272 have opposed pairs of elliptical or elongated holes 276, each pair of which normally are closed by a collapsible elastic sleeve 278 adhered to the interior of the connector 274 at narrow portions 275 midway between the holes. Narrow, stiff backing plates 280 adhered to the inner face of the sleeve 278 reinforce the portions of the sleeve surrounding the hole 276. An arcuate, elliptical plug 282 secured to the outer face of the sleeve 278 fits slidably in the hole 276 and normally lies flush with the exterior of the connector 274 to substantially fill the hole 276 to keep mud and debris out of the hole 276. While in the injection tube 122, the higher pressure water outside the connector 274 presses the plug 282 and the adjacent portion of the sleeve inwardly to open the hole 276 and form passages from the hole 276 between and along the sleeve and the connector to the ends of the sleeve. The narrow backing plates 280 give long circumferential lengths of the sleeve between the side edges of the backing plate to facilitate the semi-collapsing movement of the sleeve half from its closing position to its opening position. The sleeve is sufficiently strong or stiff that, when the higher pressure on its exterior is removed as occurs when the sleeve leaves the injection tube, the sleeve recloses the opening.

The above described irrigation lines are highly effective and inexpensive both in initial cost and in maintenance. In the line 16 no supply hose such as the hose 50 need be moved back and forth and only the line 16 and the cable 18 are required to be moved across the field. The sections of the lines 16 and 118 are composed of easily available, inexpensive hose or pipe and the couplings or connectors may be easily made from commercially available couplings, and are strong so that they have much greater strength than necessary even though having the rather large holes 70 therein. The sleeves 74 and 278 serve as effective, inexpensive, double check valves. In the systems 100 and 102, the drive units each serve to drive a plurality of towlines, and cable lengths are kept at a minimum.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an irrigation system for surface irrigating a field, a source of water under pressure located substantially midway between opposite sides of the field cable means, a pipe of a length substantially one-half the distance between the sides of the field, means securing the ends of the cable means to the ends of the pipe, means at the sides of the field for reversibly guiding the cable means, drive means for reversibly pulling the cable means to move the pipe longitudinally back and forth between the sides of the field, sprinkler means carried by the pipe, and connecting means for connecting the pipe to the source of water and permitting movement of the pipe between the sides of the field.

2. The irrigation system of claim 1 wherein the connecting means includes an injection tube connected to the source of water under pressure and through which the pipe is movable, and a plurality of valves so spaced along the pipe that there is always at least one of the valves in the injection tube and openable when in the injection tube and closed when out of the injection tube.

3. The irrigation system of claim 2 wherein the valves are check valves opened by pressure of the water in the injection tube.

4. The irrigation system of claim 2 wherein the pipe comprises a plurality of flexible plastic hose sections and a plurality of couplings connecting the hose sections together, the couplings being provided with lateral openings, each of the valves including a closure in the coupling and means mounting the closure member in the coupling and urging the closure member toward a position closing the adjacent opening.

5. The irrigation system of claim 2 wherein the sprinkler means comprises a pair of sprinkler pipes secured to the end portions of pipe in positions extending transversely of the pipe, and means supporting the sprinkler means on the ground for reversible movement along the ground.

6. The irrigation system of claim 2 wherein the length of the injection tube is a small fraction of that of the pipe.

7. The irrigation system of claim 2 wherein the source of water includes a pipeline extending along the central portion of the field, means mounting the injection tube on the pipeline in a position extending transversely of the pipeline, and means connecting the pipeline to the injection tube for flow of water to the injection tube.

8. The irrigation system of claim 7 wherein the drive means includes a motor drive mounted on the pipeline and a capstan driven by the motor drive, mounted on the pipeline and drivingly engaging the cable.

9. In an irrigation system, a pipe having a plurality of openings spaced therealong and each adjacent pair of the openings being spaced a predetermined distance apart, a plurality of check valves in the pipe, one for each opening, and permitting flow of water into the pipe through the openings and restraining flow of water out of the pipe, an injection tube slidably enclosing a portion of the pipe, a pair of seals at the ends of the injection tube spaced apart a distance greater than said predetermined distance, and means for supplying water under pressure to the injection tube.

10. The irrigation system of claim 9 wherein the pipe includes a plurality of plastic pipe sections and a plurality of couplings connecting the pipe sections together, the couplings having openings in the side walls thereof, the check valves including valve members in the couplings urged toward positions closing the openings.

11. The irrigation system of claim 10 wherein each check valve includes a portion of a sleeve of resilient material positioned in the coupling and covering the opening.

12. In an irrigation system, a pair of sprinkler hoses each of a distance of about one-half of the width of an area to be sprinkled, cable means connected to adjacent ends of the sprinkler hoses, a drive unit at one side of said area for pulling the cable means to pull the sprinkler hoses endwise to said side from the other side of said area, a pair of injection tubes located substantially midway between said sides for supplying water to the hoses, and means for supplying water under pressure to the injection tubes.

13. In an irrigation system, a pair of sprinkler hoses, a pair of cables connecting the sprinkler hoses to form an endless towline therewith, means for reversibly pulling the towline, means for guiding the towline so that the hoses move along predetermined paths, and supply means for supplying water under pressure to the hoses.

14. The irrigation system of claim 13 wherein the supply means includes a source of water under pressure and a pair of injection tubes receiving water from the source and supplying the water to the hoses.

15. The irrigation system of claim 9 wherein the check valves include flexible sheets of resilient material and means securing the sheets in the pipe in positions in which the sheets are bowed into engagement with the portions of the inner wall of the pipe which surround the openings.

16. The irrigation system of claim 15 wherein the pipe includes a plurality of pairs of openings and each sheet of resilient material being in the form of a sleeve fitting closely in the pipe and covering the inner ends of one of the pairs of openings and movable inwardly away from the openings.

17. The irrigation system of claim 15 including curved backing discs secured to the inner wall of the sleeve in positions covering the openings.

18. The irrigation system of claim 17 wherein the openings are generally elliptical with the major axes thereof parallel to the longitudinal axis of the sleeve.

19. The irrigation system of claim 15 including plug members carried by the sheets and fitting slidably in the openings.

*20. In an irrigation apparatus,*

*a pipe of a predetermined length and having in its sidewall a plurality of valve means spaced therealong,*

*a tube surrounding the pipe in spaced relationship to the pipe to provide a flow passage therewith and being shorter than said predetermined length,*

*each of the valve means being normally closed and adapted to be opened when in the tube to permit flow of water between the pipe and the tube,*

*means for opening the valve means when in the tube,*

*a pair of sealing means slidable relative to the pipe at the ends of the tube,*

*and means for effecting relative longitudinal movement between the tube and the pipe.*

*21. The irrigation apparatus of claim 20 wherein the valves are check valves.*

*22. In an irrigation apparatus,*

*a movable sprinkler line,*

*a stationary supply means for supplying water under pressure,*

*and a slip joint coupling connecting the stationary supply means to the sprinkler line,*

*the slip joint structure including an elongated pipe having valves in the sidewall thereof and spaced therealong, a tube shorter than the pipe and slidable loosely thereon, sealing means sealing the ends of the tube to the pipe and permitting sliding movement between the tube and the pipe, and means for maintaining the valves closed when not in the tube and for opening the valves when in the tube.*

*23. The irrigation apparatus of claim 22 wherein the valves are check valves, the tube is connected directly to the water supply means and the pipe is connected to the sprinkler line.*

References Cited

The following references, cited by the Examiner, are of record in the patented file of this patent or the original patent.

UNITED STATES PATENTS

| | | | |
|---|---|---|---|
| 2,286,623 | 6/1942 | Kellaher et al. | 285—5X |
| 2,807,478 | 9/1957 | Hermann et al. | 285—5 |
| 2,896,858 | 7/1959 | Price | 239—267X |
| 3,068,025 | 12/1962 | Stilwell | 285—5 |
| 3,085,549 | 4/1963 | Kacsuta | 137—525X |
| 3,175,768 | 3/1965 | Hammelmann | 239—266X |
| 3,314,606 | 4/1967 | Teigeler et al. | 239—266 |

FOREIGN PATENTS

| | | | |
|---|---|---|---|
| 1,513,948 | 1/1968 | France | 239—551 |

LLOYD L. KING, Primary Examiner

U.S. Cl. X.R.

61—12; 137—512.15; 239—186, 269, 570; 285—5

UNITED STATES PATENT OFFICE
CERTIFICATE OF CORRECTION

Patent No. RE-27,059 Dated February 16, 1971

Inventor(s) GREGORY J. WIECK

It is certified that error appears in the above-identified patent and that said Letters Patent are hereby corrected as shown below:

Column 6, line 65, after "closure" insert --member--

Signed and sealed this 25th day of May 1971.

(SEAL)
Attest:

EDWARD M.FLETCHER,JR.
Attesting Officer

WILLIAM E. SCHUYLER, JR.
Commissioner of Patents

ORM PO-1050 (10-69)

USCOMM-DC 60376-P69
☆ U.S. GOVERNMENT PRINTING OFFICE : 1969 O—366-334